United States Patent
Jose et al.

(10) Patent No.: US 10,182,088 B2
(45) Date of Patent: Jan. 15, 2019

(54) WIDEBAND RANGING IN CELLULAR USING UNLICENSED RADIO FREQUENCY SPECTRUM BAND

(71) Applicant: QUALCOMM Incorporated, San Diego, CA (US)

(72) Inventors: Jubin Jose, Belle Mead, NJ (US); Venkatesan Nallampatti Ekambaram, Somerville, NJ (US); Xinzhou Wu, Hillsborough, NJ (US); Hong Cheng, Basking Ridge, NJ (US); Shailesh Patil, Raritan, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 298 days.

(21) Appl. No.: 14/794,557

(22) Filed: Jul. 8, 2015

(65) Prior Publication Data
US 2016/0057186 A1   Feb. 25, 2016

Related U.S. Application Data

(60) Provisional application No. 62/039,187, filed on Aug. 19, 2014.

(51) Int. Cl.
*H04W 8/00*     (2009.01)
*H04L 29/06*   (2006.01)
(Continued)

(52) U.S. Cl.
CPC .......... *H04L 65/4076* (2013.01); *H04L 45/02* (2013.01); *H04W 64/00* (2013.01);
(Continued)

(58) Field of Classification Search
None
See application file for complete search history.

(56) References Cited

U.S. PATENT DOCUMENTS 6,519,464 B1   2/2003 Santhoff et al.
2006/0183484 A1*  8/2006 Ruutu .................... H04W 64/00
455/456.1
(Continued)

FOREIGN PATENT DOCUMENTS

WO   WO 2015106883 A1 *  7/2015 ............ H04W 16/14

OTHER PUBLICATIONS

3GPP, "3rd Generation Partnership Project; Technical Specification Group Radio Access Network; Location Measurement Unit (LMU) performance specification; Network based positioning systems in Evolved Universal Terrestrial Radio Access Network (E- UTRAN) (Release 11)," 3GPP TS 36.111 v11.3.0 (Jun. 2014) Technical Specification, Jun. 2014, 31 pgs., 3rd Generation Partnership Project, Sophia Antipolis, Valbonne, France.
(Continued)

*Primary Examiner* — Chirag G Shah
*Assistant Examiner* — Srinivasa R Reddivalam
(74) *Attorney, Agent, or Firm* — Holland & Hart LLP

(57) ABSTRACT

Methods, systems, and devices are described for utilization of an unlicensed radio frequency spectrum band for performing a ranging procedure. Performance of the ranging procedure may be triggered by a signal transmitted in a licensed radio frequency spectrum band. While conventional ranging in Long Term Evolution (LTE) communications, for example, using the licensed radio frequency spectrum band may be limited to a 10 MHz bandwidth, using the unlicensed radio frequency spectrum band for ranging may allow use of a wider bandwidth, such as 100 MHz or greater. Use of the wider bandwidth may result in more accurate ranging measurements (e.g., time-of-arrival estimation).

27 Claims, 12 Drawing Sheets

(51) Int. Cl.
*H04W 16/14* (2009.01)
*H04W 64/00* (2009.01)
*H04W 76/14* (2018.01)
*H04L 12/751* (2013.01)

(52) U.S. Cl.
CPC .......... *H04W 64/003* (2013.01); *H04W 8/005* (2013.01); *H04W 16/14* (2013.01); *H04W 76/14* (2018.02)

(56) References Cited

U.S. PATENT DOCUMENTS

| | | | | |
|---|---|---|---|---|
| 2010/0046440 | A1* | 2/2010 | Singh | H04W 4/021 370/329 |
| 2011/0158200 | A1* | 6/2011 | Bachu | H04L 5/0007 370/330 |
| 2011/0228666 | A1* | 9/2011 | Barbieri | H04W 76/023 370/216 |
| 2012/0207033 | A1* | 8/2012 | Hakola | H04W 16/14 370/252 |
| 2013/0059614 | A1 | 3/2013 | Kannan et al. | |
| 2013/0090125 | A1* | 4/2013 | Clifton | H04W 16/14 455/452.1 |
| 2013/0115984 | A1* | 5/2013 | Schmidt | H04W 16/14 455/501 |
| 2013/0143502 | A1* | 6/2013 | Kazmi | H04W 88/06 455/62 |
| 2013/0148642 | A1* | 6/2013 | Abraham | H04W 8/005 370/338 |
| 2013/0148643 | A1* | 6/2013 | Abraham | H04W 8/005 370/338 |

OTHER PUBLICATIONS

3GPP, "3rd Generation Partnership Project; Technical Specification Group Radio Access Network; Evolved Universal Terrestrial Radio Access Network (E-UTRAN); Stage 2 functional specification of User Equipment (UE) positioning in E-UTRAN (Release 11)," 3GPP TS 36.305 v11.1.0 (Sep. 2012) Technical Specification, Sep. 2012, 58 pgs., 3rd Generation Partnership Project, Sophia Antipolis, Valbonne, France.

ISA/EPO, International Search Report and Written Opinion of the International Searching Authority, Int'l. App. No. PCT/US2015/039701, dated Oct. 29, 2015, European Patent Office, Rijswijk, NL, 15 pgs.

* cited by examiner

WIDEBAND RANGING IN CELLULAR USING UNLICENSED RADIO FREQUENCY SPECTRUM BAND

CROSS REFERENCES

The present application for patent claims priority to U.S. Provisional Patent Application No. 62/039,187 by Jose et al., entitled "Wideband Ranging in Cellular Using Unlicensed Radio Frequency Spectrum Band," filed Aug. 19, 2014, assigned to the assignee hereof, and expressly incorporated by reference herein.

FIELD OF THE DISCLOSURE

The following relates, for example, to wireless communication, and more specifically to wireless communications in an unlicensed radio frequency spectrum band.

DESCRIPTION OF RELATED ART

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

Generally, a wireless multiple-access communications system may include a number of base stations, each simultaneously supporting communication for multiple mobile devices. Base stations may communicate with mobile devices on downstream and upstream links. Each base station has a coverage range, which may be referred to as the coverage area of the cell.

A mobile device and/or a base station may perform a ranging operation, for example, when the mobile device associates with the base station to facilitate wireless communications within the system or network. Further, mobile devices may perform a discovery operation to facilitate device-to-device (D2D) communications, such as when a mobile device joins a mesh network of mobile devices. Conventionally, such ranging and discovery operations are performed via cellular over a licensed radio frequency spectrum band. However, accuracy of range/pseudo range measurements obtained from these operations is limited by the relatively narrow bandwidth of the licensed radio frequency spectrum band.

SUMMARY

The described features, for example, relate to one or more improved systems, methods, and/or apparatuses for wireless communications. More particularly, the described features relate to techniques for obtaining accurate range/pseudo-range measurements using an unlicensed radio frequency spectrum band. In one example, a signal is transmitted over a channel in a licensed radio frequency spectrum band, for example, by a Long Term Evolution (LTE) or LTE-Advanced (LTE-A) base station or a mobile device. The signal may trigger performance of a ranging procedure over an unlicensed radio frequency spectrum band having a wider bandwidth than the licensed radio frequency spectrum band. The triggered ranging procedure may be performed by the base station, the mobile device or another wireless communication device (e.g., base station, mobile device, etc.).

A method for wireless communications is described. According to one implementation, the method may involve transmitting a signal over a licensed radio frequency spectrum band. The signal may trigger performance of a ranging procedure over an unlicensed radio frequency spectrum band.

In some examples, transmitting the signal may involve transmitting a discovery signal or a ranging signal over the licensed radio frequency spectrum band. Alternatively or additionally, transmitting the signal may involve broadcasting the signal. In such examples, the method may involve receiving a plurality of ranging signals over the unlicensed radio frequency spectrum band in response to the broadcast signal. In such examples, the method also may involve determining positioning information associated with at least one device based at least in part on the received plurality of ranging signals. Alternatively or additionally, the method may involve broadcasting ranging measurements associated with the received plurality of ranging signals.

In some examples, the method may involve determining information for performing the ranging procedure based at least in part on the signal. In such examples, determining information for performing the ranging procedure may involve decoding at least part of the signal. Alternatively or additionally, determining information for performing the ranging procedure may involve applying a pre-defined map. Alternatively or additionally, determining information for performing the ranging procedure may involve accessing a resource indicated by at least part of the signal.

In some examples, the signal may include information for performing the ranging procedure. In such examples, the information included in the signal may include information comprising bandwidth, center frequency, and time slot. In some examples, the information included in the signal may be pre-configured.

In some examples, transmitting the signal may be performed by a base station. In such examples, the signal may provide at least one parameter for coordinating the ranging procedure between at least two user equipments (UEs). In some examples, the at least one parameter provided by the signal may include a schedule for performance of the ranging procedure by the at least two UEs. In some examples, the schedule may be for periodic performance of the ranging procedure by the at least two UEs.

In other examples where transmitting the signal is performed by a base station, the ranging procedure may involve a ranging measurement. In such examples, the signal may cause at least one UE to report a result of the ranging measurement to the base station.

In other examples where transmitting the signal is performed by a base station, the signal may include a schedule for performing the ranging procedure over the unlicensed radio frequency spectrum band. In such examples, the method may involve the base station performing the ranging procedure according to the schedule. In some examples, the signal may include a schedule for at least one other base station for performing the ranging procedure over the unlicensed radio frequency spectrum band.

An apparatus for wireless communications is described. In one configuration, the apparatus may include a transmitter to transmit a signal over a licensed radio frequency spectrum band. The signal may be configured to trigger performance of a ranging procedure over an unlicensed radio frequency spectrum band. The apparatus may include these and/or other elements configured to carry out various operations of the methods described above and herein.

Another apparatus for wireless communications is described. According to one configuration, the apparatus may include means for transmitting a signal over a licensed radio frequency spectrum band. The signal may be configured to trigger performance of a ranging procedure over an unlicensed radio frequency spectrum band. The apparatus may include these and/or other elements configured to carry out various operations of the methods described above and herein.

A non-transitory computer-readable medium is described. The medium may store computer-executable code for wireless communications. The code may be executable by a processor to: transmit a signal over a licensed radio frequency spectrum band. The signal may be configured to trigger performance of a ranging procedure over an unlicensed radio frequency spectrum band. The code may be executable by the processor to perform these and/or other various operations of the methods described above and herein.

Another method for wireless communications is described. According to one configuration, the method may involve: receiving a signal over a licensed radio frequency spectrum band; and performing a ranging procedure over an unlicensed radio frequency spectrum band based at least in part on the received signal.

In some examples, receiving the signal may include receiving a discovery request message from a UE. Performing the ranging procedure may include transmitting a plurality of ranging signals on a same frequency of the unlicensed radio frequency spectrum band. Alternatively or additionally, performing the ranging procedure may include transmitting at least one ranging signal on a plurality of frequencies of the unlicensed radio frequency spectrum band.

In some examples, receiving the signal may include receiving a broadcast signal from a UE, where the received broadcast signal may include a plurality of ranging measurements from multiple devices. In such examples, the method may further include using a ranging measurement resulting from performing the ranging procedure over the unlicensed radio frequency spectrum band and at least one ranging measurement from the plurality of ranging measurements to determine a position of a device that performed the ranging procedure over the unlicensed radio frequency spectrum band.

An apparatus for wireless communications is described. In one example, the apparatus may include a receiver to receive a signal over a licensed radio frequency spectrum band and a communications manager to perform a ranging procedure over an unlicensed radio frequency spectrum band based at least in part on the received signal. The apparatus may include these and/or other elements configured to carry out various operations of the methods described above and herein.

Another apparatus for wireless communications is described. According to one example, the apparatus may include means for receiving a signal over a licensed radio frequency spectrum band; and means for performing a ranging procedure over an unlicensed radio frequency spectrum band based at least in part on the received signal. The apparatus may include these and/or other elements configured to carry out various operations of the methods described above and herein.

A non-transitory computer-readable medium is described. The non-transitory computer-readable medium may store computer-executable code for wireless communications. The code may be executable by a processor to: receive a signal over a licensed radio frequency spectrum band; and perform a ranging procedure over an unlicensed radio frequency spectrum band based at least in part on the received signal. The code may be executable by the processor to perform these and/or other various operations of the methods described above and herein.

Further scope of the applicability of the described methods and apparatuses will become apparent from the following detailed description, claims, and drawings. The detailed description and specific examples are given by way of illustration only, since various changes and modifications within the scope of the description will become apparent to those skilled in the art.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
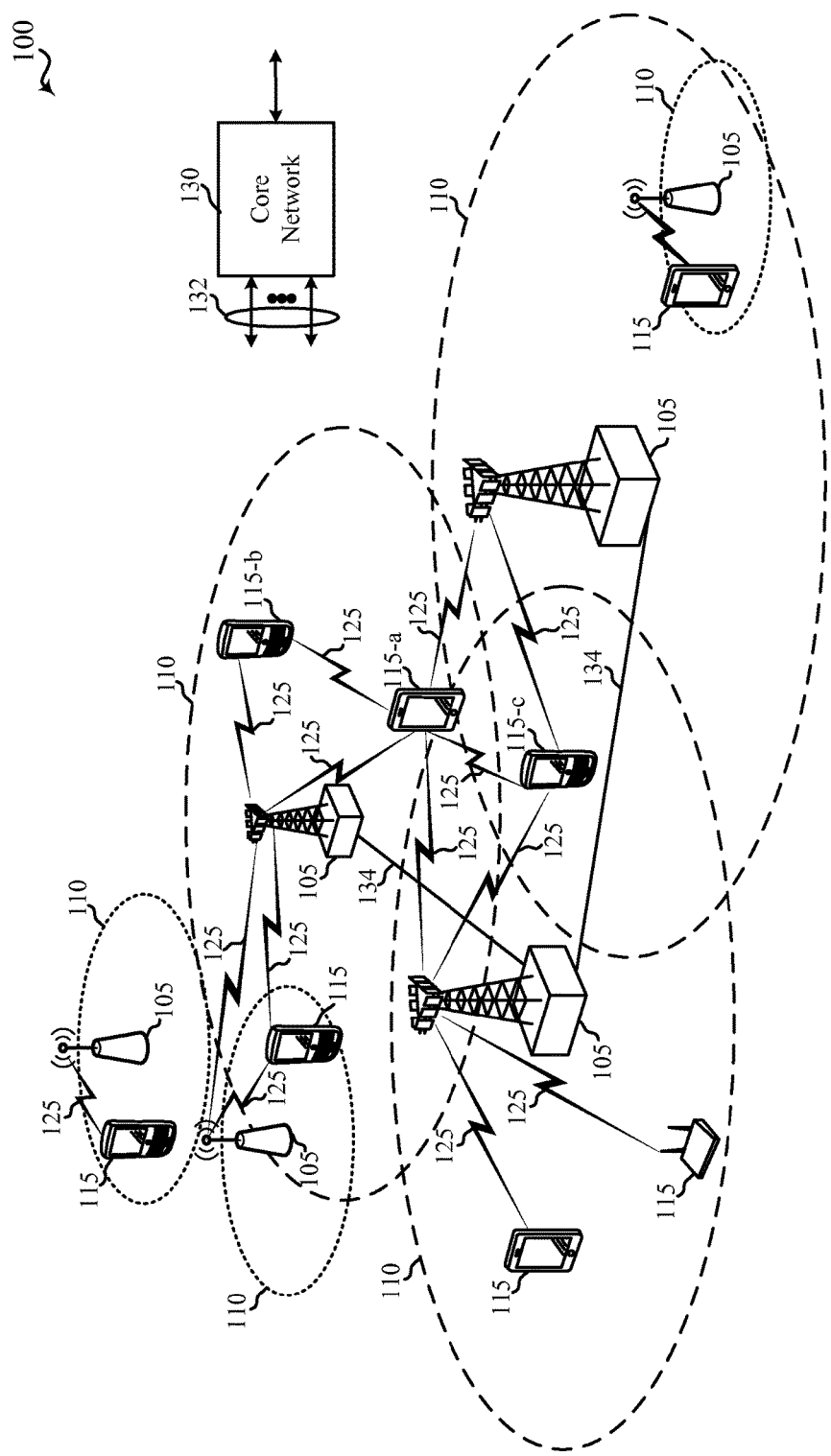
FIG. 1 shows a block diagram of a wireless communication system, in accordance with various aspects of the present disclosure.

Utilization of an unlicensed radio frequency spectrum band for performing a ranging procedure is described. Performance of the ranging procedure may be triggered by a signal transmitted in a licensed radio frequency spectrum band. While conventional ranging in Long Term Evolution (LTE) communications, for example, using the licensed radio frequency spectrum band may be limited to a 10 MHz bandwidth, using the unlicensed radio frequency spectrum band for ranging may allow use of a wider bandwidth, such as 100 MHz or greater. Use of the wider bandwidth may result in more accurate ranging measurements (e.g., time-of-arrival estimation).

According to one implementation, a first wireless device and a second wireless device (e.g., user equipments (UEs) with LTE-direct (LTE-D) capabilities) may perform a discovery operation by communicating with each other over the licensed radio frequency spectrum band (e.g., licensed LTE band). Reception by one of the wireless devices of a discovery signal from the other wireless device may be used as an indication that the devices are within range for performing a ranging procedure over an unlicensed radio frequency spectrum band. As such, the discovery signal may trigger performance of the ranging procedure over an unlicensed radio frequency spectrum band to provide accuracy for range/pseudo-range measurements.

The techniques described herein are not limited to LTE, and may also be used for various wireless communication systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). LTE and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description below, however, describes an LTE system for purposes of example, and LTE terminology is used in much of the description below, although the techniques are applicable beyond LTE applications.

The following description provides examples, and is not limiting of the scope, applicability, or configuration set forth in the claims. Changes may be made in the function and arrangement of elements discussed without departing from the scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Referring first to FIG. 1, a block diagram of a wireless communication system 100 in accordance with various aspects of the present disclosure is shown. The wireless communication system 100 may include a plurality of base stations (e.g., access points, eNBs, or WLAN access points) 105, a number of user equipment (UEs) 115, and a core network 130. Some of the base stations 105 may communicate with the UEs 115 under the control of a base station controller (not shown), which may be part of the core network 130 or certain base stations 105 (e.g., base stations or eNBs) in various implementations. Some of the base stations 105 may communicate control information and/or user data with the core network 130 through a backhaul 132. In some implementations, some of the base stations 105 may communicate, either directly or indirectly, with each other over backhaul links 134, which may be wired or wireless communication links. The wireless communication system 100 may support operation on multiple carriers (waveform signals of different frequencies). Multi-carrier transmitters can transmit modulated signals simultaneously on the multiple carriers. For example, each communications link 125 may be a multi-carrier signal modulated according to various radio technologies. Each modulated signal may be sent on a different carrier and may carry control information (e.g., reference signals, control channels, etc.), overhead information, scheduling information, data, etc.

The base stations 105 may wirelessly communicate with the UEs 115 via one or more access point antennas. Each of the base stations 105 may provide communication coverage for a respective coverage area 110. In some implementations, an access point 105 may be referred to as a base station, a base transceiver station (BTS), a radio base station, a radio transceiver, a basic service set (BSS), an extended service set (ESS), a NodeB, an evolved NodeB (eNB), a Home NodeB, a Home eNodeB, a WLAN access point, a Wi-Fi node or some other suitable terminology. The coverage area 110 for an access point 105 may be divided into sectors (not shown) making up only a portion of the respective coverage area 110. The wireless communication system 100 may include base stations 105 of different types (e.g., macro, micro, and/or pico base stations). The base stations 105 may also utilize different radio technologies, such as cellular and/or WLAN radio access technologies. The base stations 105 may be associated with the same or different access networks or operator deployments. The coverage areas 110 of different base stations 105, including the coverage areas of the same or different types of base stations 105, utilizing the same or different radio technologies, and/or belonging to the same or different access networks, may overlap. The coverage areas 110 may be considered to define cells, such as macro cells and small cells (e.g., femto cells, pico cells, etc.) as illustrated in FIG. 1. Although the small cells are shown with only a single UE 115 within the respective coverage areas for simplicity, it should be understood that any number of UEs 115 may be within the coverage area of a small cell.

In some implementations, the wireless communication system 100 may include an LTE/LTE-A communications system (or network), which LTE/LTE-A communications system may support one or more modes of operation or deployment scenarios for communicating using an unlicensed radio frequency spectrum band. In other implementations, the wireless communication system 100 may support wireless communication using a licensed radio frequency spectrum band and an access technology different from LTE/LTE-A. In LTE/LTE-A communications systems, the term evolved NodeB or eNB may be generally used to describe of the base stations 105. The wireless communication system 100 may be a heterogeneous LTE/LTE-A network in which different types of eNBs provide coverage for various geographical regions. For example, each base station 105 may provide communication coverage for a macro cell, a pico cell, a femto cell, and/or other types of cell. Small cells such as pico cells, femto cells, and/or other types of cells may include low power nodes or LPNs. A macro cell generally covers a relatively large geographic area (e.g., several kilometers in radius) and may allow unrestricted access by UEs with service subscriptions with the network provider. A pico cell may generally cover a relatively smaller geographic area and may allow unrestricted access by UEs with service subscriptions with the network provider. A femto cell may also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. An eNB may support one or multiple (e.g., two, three, four, and the like) cells.

The core network 130 may communicate with the base stations 105 via the backhaul 132 (e.g., S1 application protocol, etc.). The base stations 105 may also communicate with one another, directly or indirectly, via backhaul links 134 (e.g., X2 application protocol, etc.) and/or via backhaul 132 (e.g., through core network 130). The wireless communication system 100 may support synchronous or asynchronous operation. For synchronous operation, the base stations may have similar frame and/or gating timing, and transmissions from different base stations may be approximately aligned in time. For asynchronous operation, the base stations may have different frame and/or gating timing, and transmissions from different base stations may not be aligned in time. The techniques described herein may be used for either synchronous or asynchronous operations.

The UEs 115 may be dispersed throughout the wireless communication system 100, and each UE 115 may be stationary or mobile. A UE 115 may also be referred to by those skilled in the art as a mobile device, a mobile station, a subscriber station, a mobile unit, a subscriber unit, a wireless unit, a remote unit, a wireless device, a wireless communication device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wearable item such as a watch or glasses, a wireless local loop (WLL) station, or the like. A UE 115 may be able to communicate with macro eNBs, pico eNBs, femto eNBs, relays, and the like. A UE 115 may also be able to communicate over different access networks, such as cellular or other WWAN access networks, or WLAN access networks.

The communications links 125 shown in wireless communication system 100 may include uplinks for carrying uplink (UL) transmissions (e.g., from a UE 115 to a base station 105) and/or downlinks for carrying downlink (DL) transmissions (e.g., from a base station 105 to a UE 115). The UL transmissions may also be called reverse link transmissions, while the DL transmissions may also be called forward link transmissions. The downlink transmissions may be made using a licensed radio frequency spectrum band (e.g., LTE), an unlicensed radio frequency spectrum band, or both. Similarly, the uplink transmissions may be made using a licensed radio frequency spectrum band (e.g., LTE), an unlicensed radio frequency spectrum band, or both.

In some implementations of the wireless communication system 100, some of the UEs 115 (e.g., UE 115-a, 115-b and 115-c) may be configured to communicated directly or indirectly with one another without using one of the base stations 105. Such device-to-device (D2D) communications (over communication links 125) may employ LTE-D, for example.

A UE 115 and a base station 105 may communicate over the licensed radio frequency spectrum band (e.g., licensed LTE band) for the UE 115 to associate with the base station 105. Further, a UE 115 may communicate directly with another UE 115 over the licensed radio frequency spectrum band to discover one another and associate themselves with one another (e.g., form a mesh network for D2D communications). In either case, a signal of such communications may be used as a trigger for performance of a ranging procedure in an unlicensed radio frequency spectrum band. Ranging over an unlicensed radio frequency spectrum band in the unlicensed radio frequency spectrum band may provide increased accuracy of range-pseudo-range measurements, as compared to measurements made using the licensed radio frequency spectrum band. It should be understood that a signal transmitted/received over the licensed radio frequency spectrum band that is not part of a discovery, ranging or association procedure may also be employed to trigger the ranging procedure in the unlicensed radio frequency spectrum band.

Figure 2A:
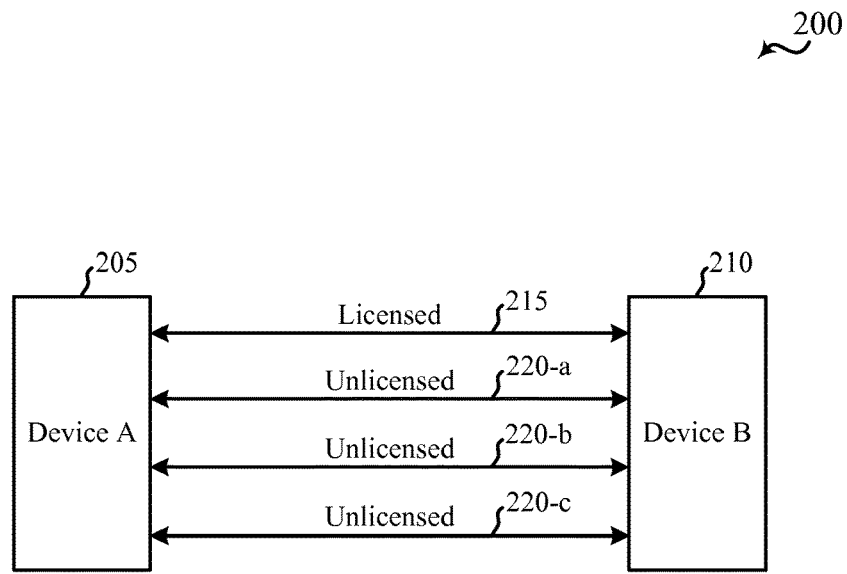
FIG. 2A shows a diagram that illustrates an example of communications between devices for discovery, association and/or ranging, in accordance with various aspects of the present disclosure.

FIG. 2A shows a diagram that illustrates an example 200 of communications between devices for discovery, association and/or ranging, in accordance with various aspects of the present disclosure. In one implementation, FIG. 2A illustrates communications between a first device 205 (device A) and a second device 210 (device B). The first and second devices 205, 210 may be part of the wireless communication system 100 of FIG. 1, such as examples of the base stations 105 of FIG. 1, the UEs 115 of FIG. 1, or a combination thereof.

FIG. 2A illustrates a first communication 215 over a licensed radio frequency spectrum band (e.g., LTE band). As noted above, the first communication 215 may be part of a discovery, ranging or association procedure between the first device 205 and the second device 210. The first communication 215 may transmitted by the first device 205 and received by the second device 210, or vice versa. The first communication 215 may be a discovery request message (e.g., LTE-D), which may indicate that the first device 205 is capable of ranging using the unlicensed radio frequency spectrum band, the identity of the first device 205, a schedule for a ranging procedure over the unlicensed radio frequency spectrum band, and/or other information for the ranging procedure. The second device 210 may send a discovery response message (not shown) to the first device 205 to indicate its own identity, etc.

The first communication 215 thus may trigger performance of the ranging procedure over the unlicensed radio frequency spectrum band, with the first device 205 and second device 210 tuning to the unlicensed radio frequency spectrum band and exchanging ranging signals according to the schedule. For example, a second communication 220-a may be a ranging signal transmitted from the first device 205 to the second device 210 via a channel of an unlicensed radio frequency spectrum band in the unlicensed radio frequency spectrum band. Alternatively or additionally, the second communication 220-a may be a ranging signal transmitted from the second device 210 to the first device 205.

In some aspects, the ranging procedure may include multiple communications via one or more channels. Thus, the ranging procedure may include a third communication 220-b and a fourth communication 220-c between the first device 205 and the second device 210, either via the same channel as the second communication 220-a or via different channels of the unlicensed radio frequency spectrum band in the unlicensed radio frequency spectrum band.

Although FIG. 2A illustrates one second device 210 (device B), it should be understood that there may be multiple instances of the second device 210 that receive the first communication 215 (e.g., broadcast by the first device 205). Thus, multiple instances of the second device 210 may be triggered to perform a ranging procedure with the first device 205 using the unlicensed radio frequency spectrum band.

In some aspects, the signal in the licensed radio frequency spectrum band (first communication 215 in the example 200 of FIG. 2A) that triggers the ranging procedure may include information for performing the ranging procedure. For example, the included information may be bandwidth, center frequency, and time slot for the ranging procedure. In some cases, the information included in the triggering signal may be determined or pre-configured, for example, for the capabilities of the devices involved in the ranging procedure. The information may be explicitly included in the triggering signal (e.g., encoded in the signal and decoded by the device(s)) or otherwise indicated by or determined from the triggering signal. For example, an index to information for the ranging procedure may be included in the triggering signal. Alternatively or additionally, the triggering signal may include a pointer to a resource that may be accessed by the device(s) to obtain information for performing the ranging procedure. Alternatively or additionally, some information may be implicitly indicated by the triggering signal.

A time for the range measurement(s) of the ranging procedure may be included in or indicated by the triggering signal. For example, the time may be implicitly indicated, for example, with the devices configured to perform the ranging measurement(s) at a pre-set time(s) after receiving the triggering signal. The included/indicated time may be used to synchronize the devices involved in the ranging procedure so that the devices may start the range measurement(s) at a specified point in time (e.g., tune to a specific band and send/listen for the ranging signal).

A band for the range measurement(s) of the ranging procedure may be included in or indicated by the triggering signal. For example, the band may be implicitly indicated, for example, by a pre-set map, which may be based on a current network or location of the device(s). For example, the device(s) may determine network or location information from broadcasts by the network (e.g., LTE system information broadcast (SIB)), and determine which of a plurality of pre-set band maps should be used for the range measurement(s). The included/indicated band may identify where in spectrum space the ranging signal(s) for the range measurement(s) should be made. The band may be, for example, a predetermined band (e.g., unlicensed band set for LTE communications in an unlicensed radio frequency spectrum band) or may be an unused band available for the particular network or location of the devices.

Band information included in or indicated by the triggering signal may further identify the width of the band to be used for the range measurement(s) of the ranging procedure. The width may be pre-set or may depend on the capabilities of the devices involved in the ranging procedure (e.g., hardware capabilities and/or specific configurations (e.g., battery, computation power, etc.)).

A signal type and/or format for the ranging signal(s) of the ranging procedure also may be included in or indicated by the triggering signal. For example, an LTE-D discovery message, an LTE-D communication message, or a Wi-Fi message may be used for the ranging signal. In some cases, the signal type and/or format may indicate what information is to be included (or indicated by) the ranging signal (e.g., time-of-arrival information, time-of-departure information, or other information).

A schedule for the ranging signal(s) of the ranging procedure also may be included in or indicated by the triggering signal. For example, in the case of a ranging procedure that involves a plurality of signal exchanges (e.g., ranging signals), the schedule may coordinate the signal exchanges (e.g., with the schedule indicating a sequence for measurement operations). The schedule may indicate times, frequency bands, etc. for the ranging signals. Thus, a schedule may be employed where multiple channels are used for the ranging signal(s) of the ranging procedure.

Identifiers for the devices involved in the ranging procedure may be included in or indicated by the triggering signal. For example, devices other than the devices involved in the ranging procedure may be using the unlicensed radio frequency spectrum band. Thus, device identifiers may allow the devices involved in the ranging procedure to determine which signals in the unlicensed radio frequency spectrum band are intended for the ranging procedure. Including device identifiers in the triggering signal (e.g., LTE-D discovery message) may allow the devices involved in the ranging procedure to filter out ranging signals that are not part of their ranging procedure.

As discussed above, various information elements may be included (e.g., encoded) in the triggering signal. Alternatively or additionally, various information elements may be inferred from the triggering signal. For example, a sequence in the triggering signal may indicate a pre-defined mapping to information (e.g., the sequence may map to: transmit ranging signal in two seconds from triggering signal, at 5 GHz band 36, with a bandwidth of 80 MHz, and with channel stitching using 80 MHz increments for five times without overlapping bandwidth).

In some aspects, the triggering signal may be transmitted by a base station (e.g., received by both the first device 205 and second device 210, instead of the first communication 215 occurring between the first device 205 and second device 210). In such case, the triggering signal may provide a parameter(s) for coordinating the ranging procedure between user equipments (UEs). The parameter provided by the triggering signal may be a schedule for performance of the ranging procedure by the UEs. In some cases, the schedule may indicate periodic performance of the ranging procedure by the UEs. In some cases, results of the ranging measurements of the ranging procedure performed by the UEs may be reported to the base station.

In some aspects, a base station may schedule and transmit (e.g., broadcast) a ranging signal(s) in the unlicensed radio frequency spectrum band to perform a ranging procedure(s) with greater accuracy than with the licensed radio frequency spectrum band. Further, the base station may receive and/or provide information regarding schedules of other base stations.

Figure 2B:
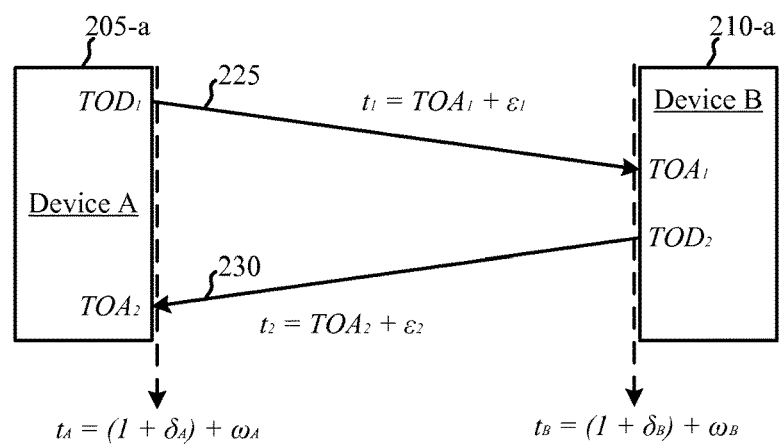
FIG. 2B shows a diagram that illustrates an example of communications between devices for ranging, in accordance with various aspects of the present disclosure.

FIG. 2B shows a diagram that illustrates an example 250 of communications between devices for a ranging procedure, in accordance with various aspects of the present disclosure. In one implementation, FIG. 2B illustrates communications between a first device 205-a (device A) and a second device 210-a (device B). The first device 205-a and second device 210-a may be part of the wireless communication system 100 of FIG. 1, such as examples of the base stations 105 of FIG. 1, the UEs 115 of FIG. 1, or a combination thereof. A first timeline $t_A$ for the first device 205-a may be determined by a local clock of the first device 205-a, with $\delta_A$ representing drift and $\omega_A$ representing operating frequency of the corresponding local clock. A second timeline $t_B$ for the second device 210-a may be determined by a local clock of the second device 210-a, with $\delta_B$ representing drift and $\omega_B$ representing operating frequency of the corresponding local clock.

FIG. 2B illustrates a first ranging signal 225 transmitted from the first device 205-a at a first time-of-departure ($TOD_1$) and received by the second device 210-a at a first time-of-arrival ($TOA_1$). The time taken for transmission of the first ranging signal 225 between the first device 205-a and the second device 210-a may be estimated using the first time-of-arrival ($TOA_1$), plus some error component ($\varepsilon_1$) associated with the local clock of the second device 210-a. If the first device 205-a and the second device 210-a are synchronized (e.g., synchronized local clocks), the time-of-arrival estimate ($t_1=TOA_1+\varepsilon_1$) may be used along with the time-of-departure ($TOD_1$) to compute or otherwise determine a range between the first device 205-a and the second device 210-a. The second device 210-a may estimate the first time-of-arrival ($TOA_1$) from the first ranging signal 225, and may obtain the first time-of-departure ($TOD_1$) from the first device 205-a, or from a base station 105 (not shown).

If the first device 205-a and the second device 210-a are not synchronized (e.g., local clocks with different times and/or operating frequencies), a second ranging signal 230 may be transmitted from the second device 210-a at a second time-of-departure ($TOD_2$) and received by the first device 205-a at a second time-of-arrival ($TOA_2$). The time taken for transmission of the second ranging signal 230 between the first device 205-a and second device 210-a may be estimated using the second time-of-arrival ($TOA_2$), plus some error component ($\varepsilon_2$) associated with the local clock of the first device 205-a. Both time-of-arrival estimates ($t_1=TOA_1+\varepsilon_1$ and $t_2=TOA_2+\varepsilon_2$) may be used along with both times-of-departure ($TOD_1$ and $TOD_2$) to compute or otherwise determine round-trip-time (RTT), and thus the range between the first device 205-a and second device 210-a. The first device 205-a may transmit the first time-of-departure ($TOD_1$) to the second device 210-a, and the second device 210-a may transmit the second time-of-departure ($TOD_2$) to the first device 205-a.

Although not shown in FIG. 2B, if there are multiple time-of-arrival (TOA) measurements available in a network with a plurality of devices (e.g., first device 205-a, second device 210-a and at least one other device), the time-of-arrival measurements may be used (e.g., processed together) to estimate position(s) of device(s) with unknown position(s), even if the plurality of devices are not synchronized. For example, the first device 205-a may broadcast time-of-arrival measurements from multiple devices. The second device 210-a may use its own time-of-arrival measurements and time-of-arrival measurements obtained from at least one other device (e.g., the first device 205-a) to determine its position.

Figure 3A:
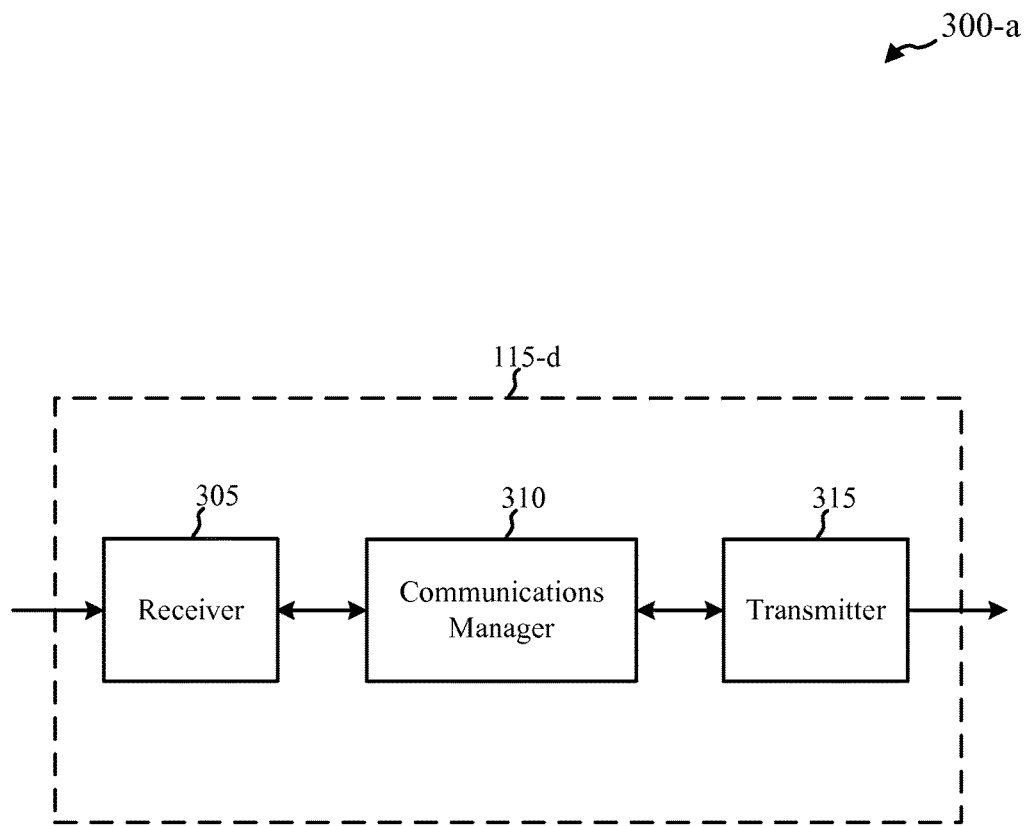
FIG. 3A shows a block diagram of an example of an apparatus that may be used for wireless communications, in accordance with various aspects of the present disclosure.

Turning now to FIG. 3A, a block diagram 300-a of an apparatus 115-d is shown that may be used for wireless communications, in accordance with various aspects of the present disclosure. In some implementations, the apparatus 115-d may be an example of various aspects of the UEs 115 described with reference to FIG. 1 and/or the devices 205, 210 described with reference to FIGS. 2A and/or 2B. The apparatus 115-d may also be a processor. The apparatus 115-d may include a receiver 305, a communications manager 310, and/or a transmitter 315. Each of these components may be in communication with each other.

The components of the apparatus 115-d may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

In some implementations, the receiver 305 may be or include a radio frequency (RF) receiver, such as an RF receiver operable to receive transmissions in a first radio frequency spectrum band and/or a second radio frequency spectrum band. In some cases, the first radio frequency spectrum band may be a licensed radio frequency spectrum band (e.g., an LTE/LTE-A radio frequency spectrum band) and/or the second radio frequency spectrum band may be an unlicensed radio frequency spectrum band. In some cases, the receiver 305 may include separate RF receivers for the first radio frequency spectrum band and the second radio frequency spectrum band. The receiver 305 may be used to receive various types of data and/or control signals (e.g., transmissions) over communication link(s) (e.g., physical channels) of a wireless communication system including the first radio frequency spectrum band and/or the second radio frequency spectrum band, such as communication links of the wireless communication system 100 described with reference to FIG. 1.

In some implementations, the transmitter 315 may be or include an RF transmitter, such as an RF transmitter operable to transmit in the first radio frequency spectrum band and/or the second radio frequency spectrum band. In some cases, the transmitter 315 may include separate RF transmitters for the first radio frequency spectrum band and the second radio frequency spectrum band. The transmitter 315 may be used to transmit various types of data and/or control signals (e.g., transmissions) over communication link(s) (e.g., physical channels) of a wireless communication system, such as communication links of the wireless communication system 100 described with reference to FIG. 1.

In some implementations, the communications manager 310 may be used to manage wireless communication over the first radio frequency spectrum band and/or the second radio frequency spectrum band. For example, the communications manager 310 may be used to manage communications for a discovery, association and/or ranging procedure using the first radio frequency spectrum band. Further, the communications manager 310 may be used to manage communications for a ranging procedure using the second radio frequency spectrum band.

As discussed herein, the receiver 305 may receive a signal over the first radio frequency spectrum band (licensed radio frequency spectrum band). The received signal may be a triggering signal and cause the communications manager 310 to carry out the ranging procedure using the second radio frequency spectrum band (unlicensed radio frequency spectrum band) using the transmitter 315 and/or the receiver 305.

Alternatively or additionally, the communications manager 310 may use the transmitter 315 to send a triggering signal as part of the discovery, association and/or ranging procedure using the first radio frequency spectrum band (licensed radio frequency spectrum band). Again, the triggering signal may cause the communications manager 310 to carry out the ranging procedure using the second radio frequency spectrum band (unlicensed radio frequency spectrum band).

As discussed herein, the triggering signal may include or otherwise indicate information for performing the ranging procedure using the second radio frequency spectrum band (unlicensed radio frequency spectrum band). Thus, in some implementations, the communications manager 310 may be configured to include or otherwise indicate such information in the triggering signal sent via the transmitter 315. Further, the communications manager 310 may be configured to determine such information included in a received signal. For example, the communications manager 310 may be configured to parse (e.g., include or control a signal parser) the received signal to identify information contained in information elements of the received signal. Alternatively or additionally, the communications manager 310 may be configured to decode (e.g., include or control a signal decoder) the received signal to obtain information therein. Further, as discussed herein, the communications manager 310 may be configured use (e.g., map) information contained in the received signal to obtain information for performing the ranging procedure.

Figure 3B:
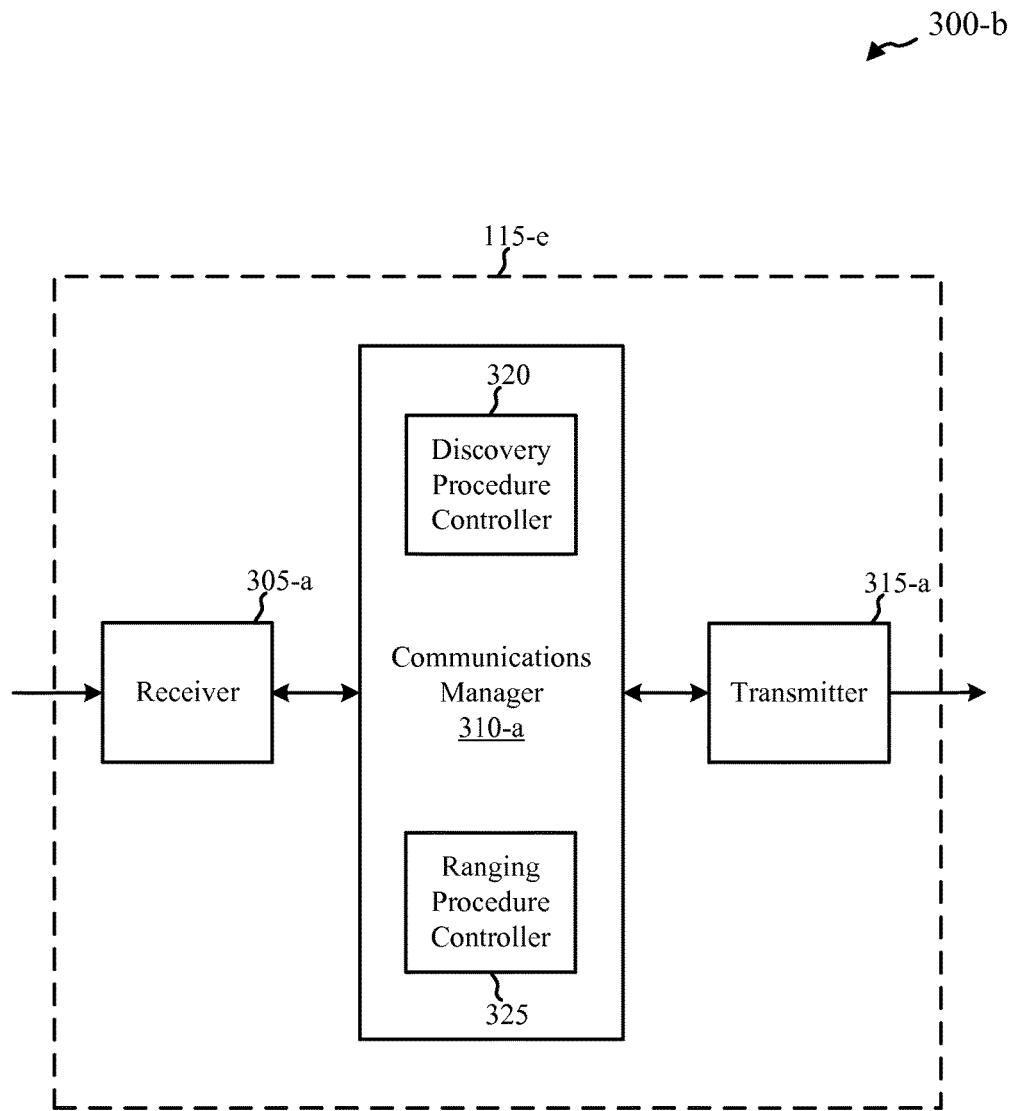
FIG. 3B shows a block diagram of another example of an apparatus that may be used for wireless communications, in accordance with various aspects of the present disclosure.

FIG. 3B shows a block diagram 300-b of an apparatus 115-e that may be used for wireless communications, in accordance with various aspects of the present disclosure. In some implementations, the apparatus 115-e may be an example of various aspects of the apparatus 115-d described above with reference to FIG. 3A and/or the UEs 115 described with reference to FIG. 1. The apparatus 115-e may also be a processor. The apparatus 115-e may include a receiver 305-a, a communications manager 310-a, and/or a transmitter 315-a. Each of these components may be in communication with each other.

The components of the apparatus 115-e may, individually or collectively, be implemented using one or more ASICs adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some implementations, the receiver 305-a and the transmitter 315-a may be configured similarly to the receiver 305 and the transmitter 315, respectively, as described above with reference to FIG. 3A.

In some implementations, the communications manager 310-a may be configured to perform similar operations as the communications manager 310 described above with reference to FIG. 3A. Further, the communications manager 310-a may include a discovery procedure controller 320 that is configured to control discovery operations, for example, for LTE-D discovery. The communications manager 310-a thus may be configured to implement the discovery process via communications over a first radio frequency spectrum band (licensed radio frequency spectrum band) using the discovery procedure controller 320.

Additionally or alternatively, the communications manager 310-a may include a ranging procedure controller 325 that is configured to control ranging operations, for example, for ranging. The communications manager 310-a thus may be configured to implement the ranging process via communications over a second radio frequency spectrum band (unlicensed radio frequency spectrum band) using the ranging procedure controller 325.

As discussed above, the communications manager 310-a transmit or receive a triggering signal (via the transmitter 315-a or the receiver 305-a) over the first radio frequency spectrum band (licensed radio frequency spectrum band). In the case of transmitting the triggering signal, the communications manager 310-a may employ a communication generated by the discovery procedure controller 320 as the triggering signal. Thus, the triggering signal may be transmitted via the transmitter 315-a as part of the discovery process carried out by the discovery procedure controller 320.

Transmission or reception of the triggering signal may cause the communications manager 310-a to initiate a ranging procedure using the second radio frequency spectrum band (unlicensed radio frequency spectrum band). Thus, the communications manager 310-a may instruct the ranging procedure controller 325 to carry out the ranging procedure over the second radio frequency spectrum band (unlicensed radio frequency spectrum band). As discussed above, the communications manager 310-a may obtain or determine information for the ranging procedure from the triggering signal (unless such information is already known to the communications manager 310-a, e.g., when the communications manager 310-a generates the triggering signal or provides the information for the triggering signal), and may provide that information to the ranging procedure controller 325 for carrying out a coordinated ranging procedure with another device(s).

Figure 3C:
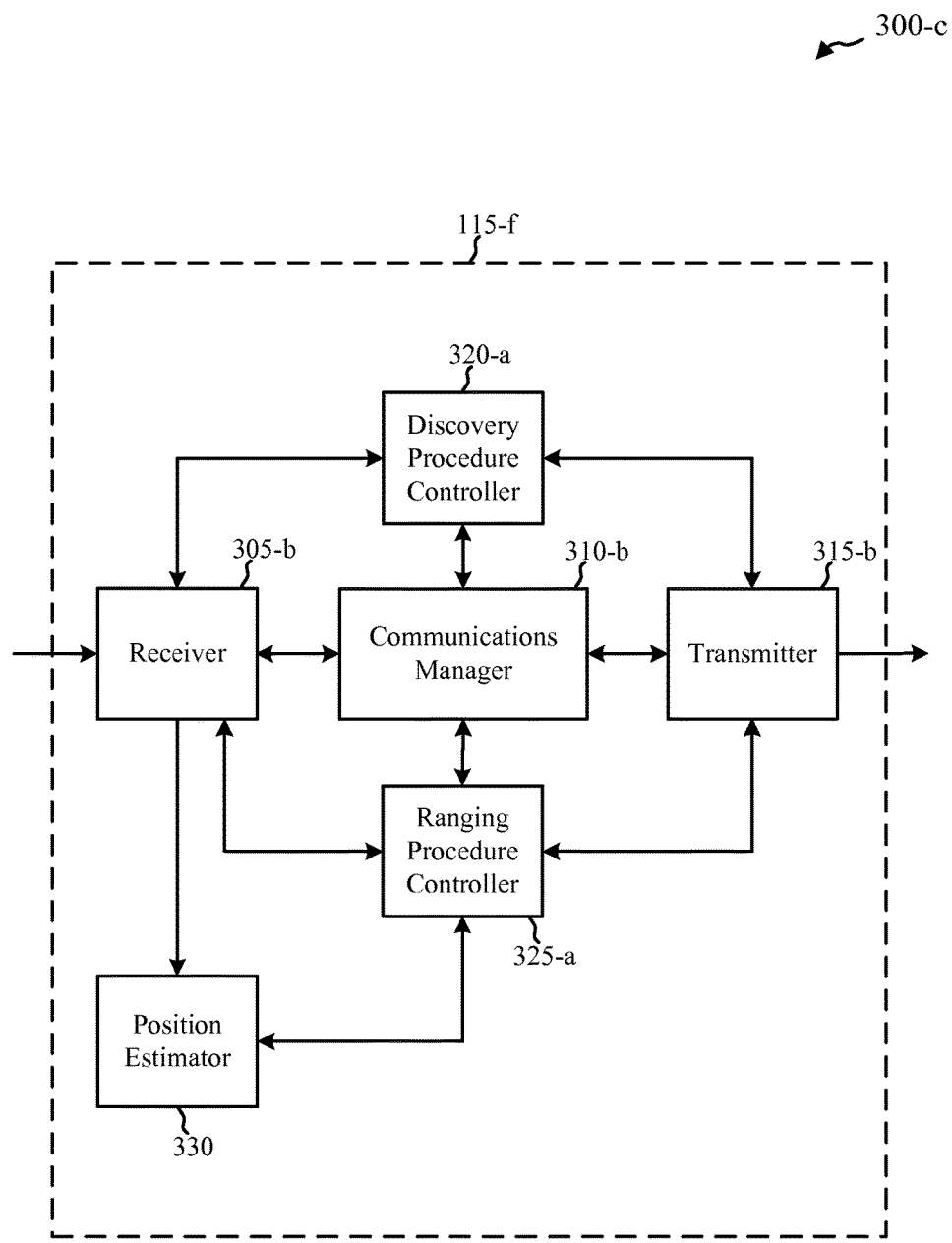
FIG. 3C shows a block diagram of yet another example of an apparatus that may be used for wireless communications, in accordance with various aspects of the present disclosure.

FIG. 3C shows a block diagram 300-c of an apparatus 115-f for use in wireless communication, in accordance with various aspects of the present disclosure. In some implementations, the apparatus 115-f may be an example of various aspects of the apparatus 115-d, 115-e described above with reference to FIGS. 3A and/or 3B, and/or the UEs 115 described with reference to FIG. 1. The apparatus 115-f may also be a processor. The apparatus 115-f may include a receiver 305-b, a communications manager 310-b, a transmitter 315-b, a discovery procedure controller 320-a, and/or a ranging procedure controller 325-a. Each of these components may be in communication with each other.

The components of the apparatus 115-*f* may, individually or collectively, be implemented using one or more ASICs adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some implementations, the receiver 305-*b* and the transmitter 315-*b* may be configured similarly to the receiver 305 and the transmitter 315, respectively, as described above with reference to FIG. 3A.

In some implementations, the communications manager 310-*b* may be configured to perform similar operations as the communications manager 310 described above with reference to FIG. 3A and/or the communications manager 310-*a* described above with reference to FIG. 3B. However, in this example, the discovery procedure controller 320-*a* and the ranging procedure controller 325-*a* are shown as separate elements from the communications manager 310-*b*.

As discussed herein, the apparatus 115-*f* may be configured to broadcast a ranging signal (using the communications manager 310-*b* and/or the ranging procedure controller 325-*a* in cooperation with the transmitter 315-*b*). In response, the receiver 305-*b* may receive multiple signals (e.g., ranging signals) from multiple devices.

The apparatus 115-*f* may include a position estimator 330 in communication with the receiver 305-*b*, the ranging procedure controller 325-*a*, and/or the communications manager 310-*b*. The position estimator 330, which may be a separate element as shown or incorporated as a subcomponent of the communications manager 310-*b* or the receiver 305-*b*, may be configured to receive or otherwise obtain the multiple signals received in response to the broadcast ranging signal (or at least information included or indicated in the multiple signals). The position estimator 330 may use the information included/indicated in the multiple signals, such as time-of-arrival, time-of-departure, known locations or positions of the multiple devices, etc., to determine (e.g., calculate) ranges between the apparatus 115-*f* and the multiple devices and/or a current position of the apparatus 115-*f*. Alternatively, the ranging procedure controller 325-*a* may determine the ranges, and may provide the ranges to the position estimator 330 for determining the current position of the apparatus 115-*f*.

Alternatively or additionally, the position estimator 330 may be configured to receive information regarding multiple signals from multiple devices from a single device. For example, the single device may be configured to receive the multiple signals (e.g., multiple ranging signals) over a predefined period according to a schedule. The single device may, in turn, transmit one signal at a predefined time in the schedule. The one signal may include measurement results for all of the received multiple signals. The position estimator 330 may use the measurement results to determine the current position of the apparatus 115-*f*.

Figure 4:
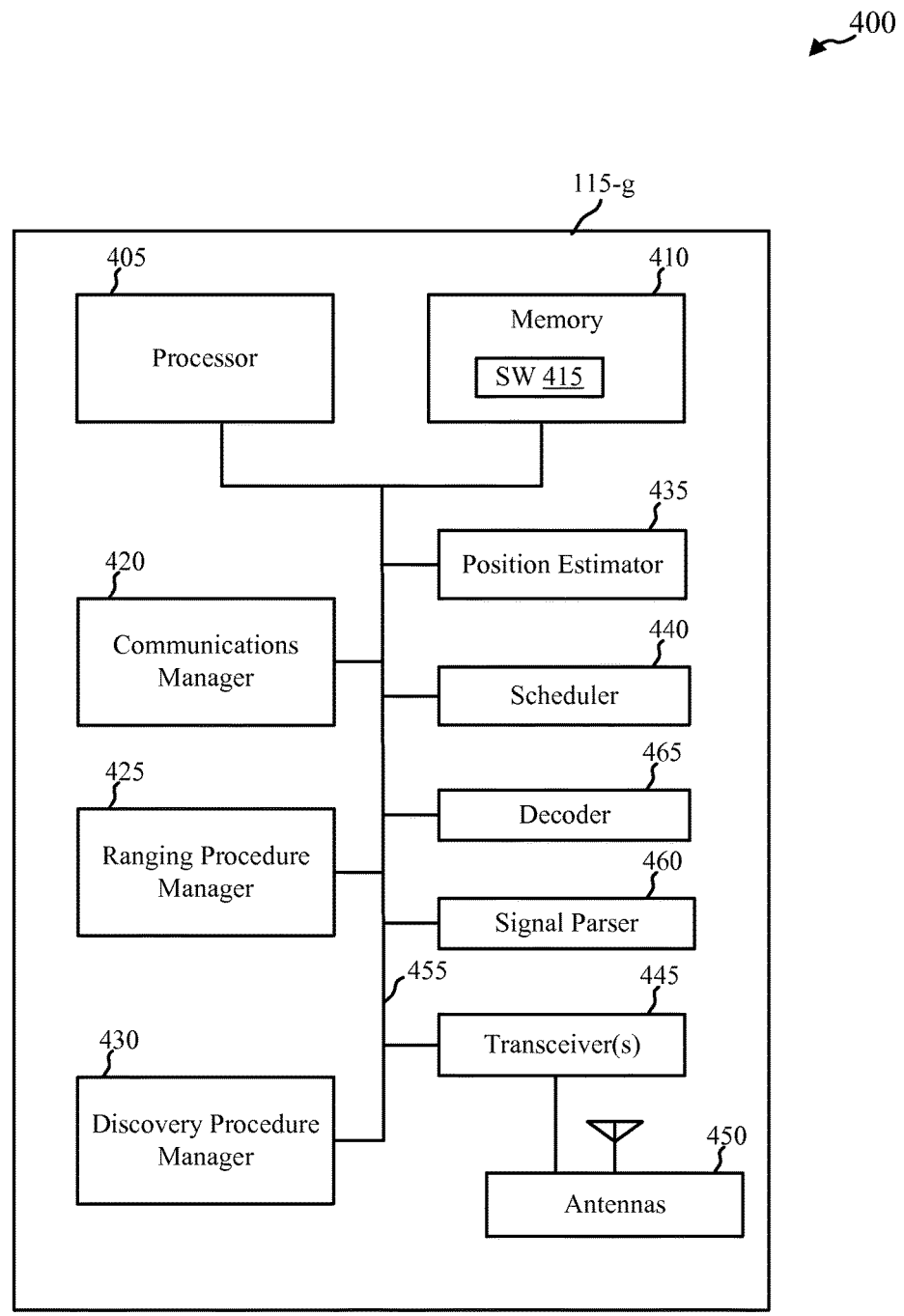
FIG. 4 shows a block diagram illustrating an example of an architecture for a user equipment (UE) configured for wireless communications, in accordance with various aspects of the present disclosure.

FIG. 4 shows a block diagram 400 of an example of an architecture for a UE 115-*g* configured for wireless communications, in accordance with various aspects of the present disclosure. The UE 115-*g* may have various configurations and may be included or be part of a personal computer (e.g., a laptop computer, netbook computer, tablet computer, etc.), a cellular telephone (e.g., a smartphone), a PDA, a digital video recorder (DVR), an internet appliance, a gaming console, an e-reader, etc. The UE 115-*g* may in some cases have an internal power supply (not shown), such as a small battery, to facilitate mobile operation. In some embodiments, the UE 115-*g* may be an example of various aspects of the apparatus 115-*d*, 115-*e* and/or 115-*f* described with reference to FIGS. 3A, 3B and/or 3C, and/or the UEs 115, 115-*a*, 115-*b* and/or 115-*c* described with reference to FIG. 1. The UE 115-*g* may be configured to implement at least some of the features and functions described with reference to FIGS. 1, 2A, 2B, 3A, 3B and/or 3C. The UE 115-*g* may be configured to communicate with a base station 105 described with reference to FIG. 1.

The UE 115-*g* may include a processor 405, a memory 410, a communications manager 420, a ranging procedure manager 425, a discovery procedure manager 430, a position estimator 435, a scheduler 440, at least one transceiver 445, a signal parser 460, a signal decoder 465, and/or at least one antenna 450. Each of these components may be in communication with each other, directly or indirectly, over a bus 455.

The memory 410 may include random access memory (RAM) and/or read-only memory (ROM). The memory 410 may store computer-readable, computer-executable software (SW) code 415 containing instructions that are configured to, when executed, cause the processor 405 to perform various functions described herein for communicating over a licensed radio frequency spectrum band and an unlicensed radio frequency spectrum band. Alternatively, the software code 415 may not be directly executable by the processor 405 but be configured to cause the UE 115-*g* (e.g., when compiled and executed) to perform various of the functions described herein.

The processor 405 may include an intelligent hardware device, e.g., a central processing unit (CPU), a microcontroller, an ASIC, etc. The processor 405 may process information received through the transceiver(s) 445 and/or information to be sent to the transceiver(s) 445 for transmission through the antenna(s) 450. The processor 405 may handle, alone or in connection with the communications manager 420, the ranging procedure manager 425, the discovery procedure manager 430, and/or the scheduler 440, various aspects of communicating over the licensed radio frequency spectrum band and over the unlicensed radio frequency spectrum band.

The transceiver(s) 445 may include a modem configured to modulate packets and provide the modulated packets to the antenna(s) 450 for transmission, and to demodulate packets received from the antenna(s) 450. The transceiver(s) 445 may in some cases be implemented as one or more transmitters and one or more separate receivers. The transceiver(s) 445 may support communications in the first radio frequency spectrum band and/or the second radio frequency spectrum band. The transceiver(s) 445 may be configured to communicate bi-directionally, via the antenna(s) 450, with the base station(s) 105 described with reference to FIG. 1. While the UE 115-*g* may include a single antenna 450, there may be implementations in which the UE 115-*g* may include multiple antennas 450.

The communications manager 420 may be configured to perform and/or control some or all of the features and/or functions described with reference to FIGS. 1, 2A, 2B, 3A, 3B and/or 3C related to wireless communication in the licensed radio frequency spectrum band and in the unlicensed radio frequency spectrum band. For example, communications manager 420 may be configured to implement a triggering scheme for causing the ranging procedure manager 425 to perform ranging operations including communications (e.g., ranging signals) over the unlicensed radio frequency spectrum band to achieve a desired level of accuracy for range/pseudo-range measurements. The communications manager 420 may be configured to control the discovery procedure manager 430 to provide or obtain a triggering signal (transmitted/received over the licensed radio frequency spectrum band) as described herein. The communications manager 420 may be an example of various aspects of the communications manager 310, 310-a and/or 310-b described with reference to FIGS. 3A, 3B and/or 3C. The communications manager 420, or portions of it, may include a processor, and/or some or all of the functionality of the communications manager 420 may be performed by the processor 405 and/or in connection with the processor 405.

As described herein, the triggering signal may include or otherwise indicate information for performing the ranging procedure using an unlicensed radio frequency spectrum band. The signal parser 460 may be configured to parse the received signal to identify the information contained in information elements of the received signal. The decoder 465 may be configured to decode the received signal to obtain information therein. Alternatively, the signal parser 460 and the decoder 465 may be implemented as part of the communications manager 420.

Figure 5:
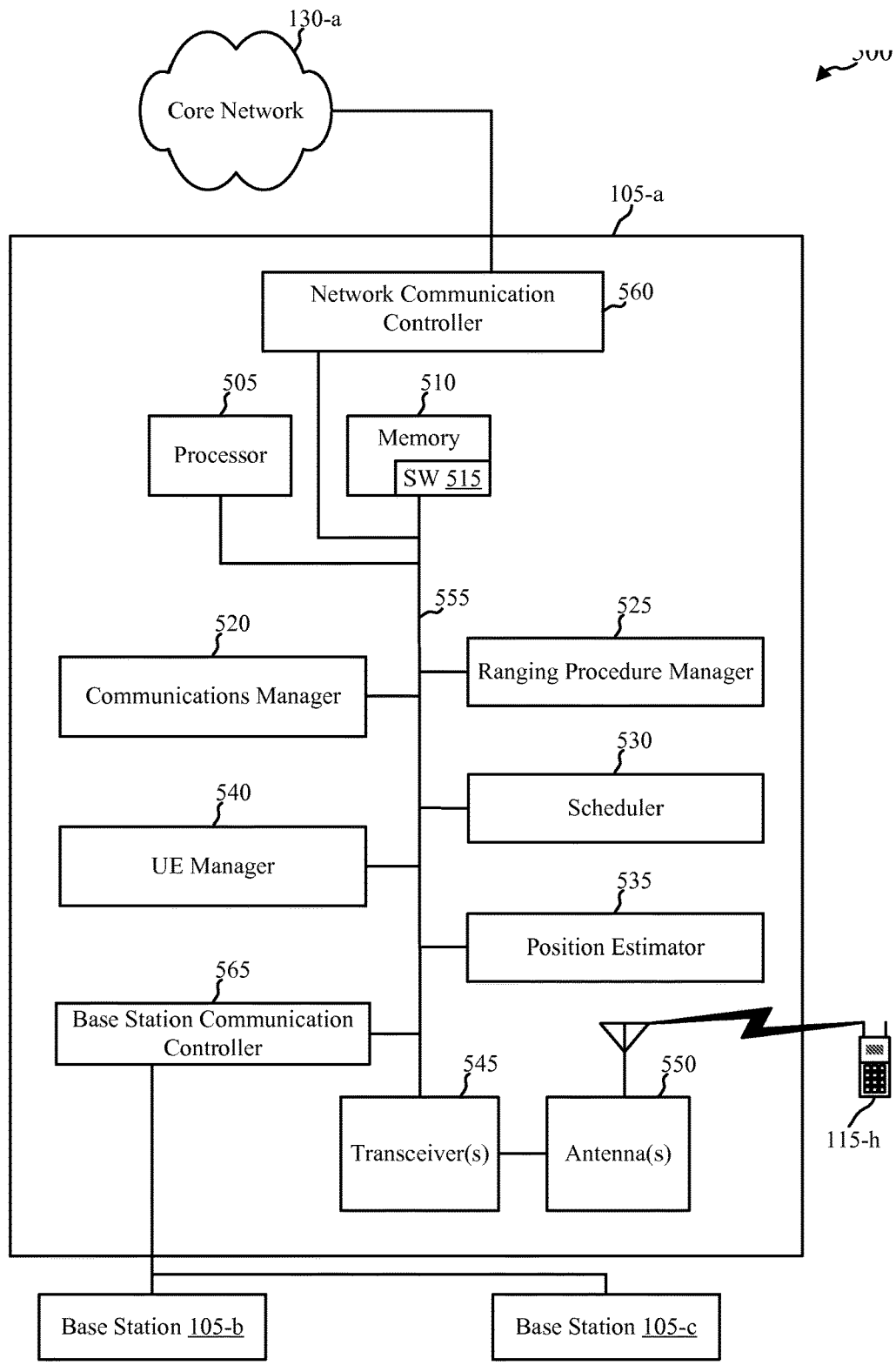
FIG. 5 shows a diagram illustrating an example of an architecture for a base station configured for wireless communications, in accordance with various aspects of the present disclosure.

FIG. 5 shows a diagram illustrating an example of an architecture for a base station 105-a, e.g., an eNB, as part of a communications system 500 that may be configured for wireless communications in accordance with various embodiments. The communications system 500 may be an example of aspects of the wireless communication system 100 depicted in FIG. 1. Further, aspects of the base station 105-a may be implemented in a base station 105 of FIG. 1. The base station 105-a may include a processor 505, memory 510, a communications manager 520, a ranging procedure manager 525, a scheduler 530, a position estimator 535, a UE manager 540, transceiver(s) 545 and antenna(s) 550, which each may be in communication, directly or indirectly, with each other (e.g., over one or more buses 555). The transceiver(s) 545 may be configured to communicate bi-directionally, via the antenna(s) 550, with a UE 115-h, which may be a multi-mode mobile device. The transceiver(s) 545 (and/or other components of the base station 105-a) may also be configured to communicate bi-directionally with one or more networks. In some cases, the base station 105-a may communicate with a core network 130-a through a network communications controller 560. Base station 105-a may be an example of an eNodeB base station, a Home eNodeB base station, a NodeB base station, and/or a Home NodeB base station.

Base station 105-a may also communicate with other base stations 105, such as base station 105-b and base station 105-c. Each of the base stations 105 may communicate with UE 115-h using different wireless communications technologies, such as different radio access technologies. In some cases, base station 105-a may communicate with other base stations such as base station 105-b and/or base station 105-c using a base station communication controller 565. In some embodiments, base station communication controller 565 may provide an X2 interface within an LTE/LTE-A wireless communication technology to provide communication between some of the base stations 105. In some embodiments, base station 105-a may communicate with other base stations through the core network 130-a.

The memory 510 may include RAM and ROM. The memory 510 may also store computer-readable, computer-executable software code 515 containing instructions that are configured to, when executed, cause the processor 505 to perform various functions described herein (e.g., generating, transmitting, receiving and/or processing signals, scheduling, determining range and/or position, etc.). Alternatively, the software code 515 may not be directly executable by the processor 505 but be configured to cause the computer, e.g., when compiled and executed, to perform functions described herein.

The processor 505 may include an intelligent hardware device, e.g., a CPU such as those made by Intel® Corporation or AMD®, a microcontroller, an ASIC, etc.

The transceiver(s) 545 may include one or more modems configured to modulate the packets and provide the modulated packets to the antenna(s) 550 for transmission, and to demodulate packets received from the antenna(s) 550. While some examples of the base station 105-a may include a single antenna 550, the base station 105-a preferably includes multiple antennas 550 for multiple links which may support carrier aggregation. For example, one or more links may be used to support macro communications with UE 115-h.

The communications manager 520 may manage communications with UE 115-h, other base stations 105-b and 105-c, and the network 130-a. By way of example, the communications manager 520 may be a component of the base station 105-a in communication with some or all of the other components of the base station 105-a via the bus 555. Alternatively, functionality of the communications manager 520 may be implemented as a component of the transceiver(s) 545, as a computer program product, and/or as one or more controller elements of the processor 505.

The components of base station 105-a may be configured to implement aspects discussed above with respect the base stations 105 of FIG. 1, and may not be repeated here for the sake of brevity. For example, base station 105-a may include the ranging procedure manager 525 to facilitate the ranging operations using the licensed radio frequency spectrum band and using the unlicensed radio frequency spectrum band described herein. The ranging procedure manager 525 may be configured to generate (and transmit via the transceiver(s) 545 and the antenna(s) 550) a triggering signal as described herein. The generated triggering signal may include information for performing a ranging procedure using the unlicensed radio frequency spectrum band as described herein. For example, the scheduler 530 may provide scheduling information for generating the triggering signal, which may indicate a schedule for the base station 105-a, for other base stations 105, and/or for coordination between UEs 115.

The base station 105-a may include the UE manager 540 to keep track of information regarding individual UEs (e.g., identity, position/location, capabilities, configuration, status, etc.) and may facilitate ranging procedures between UEs, such as described herein.

Figure 6:
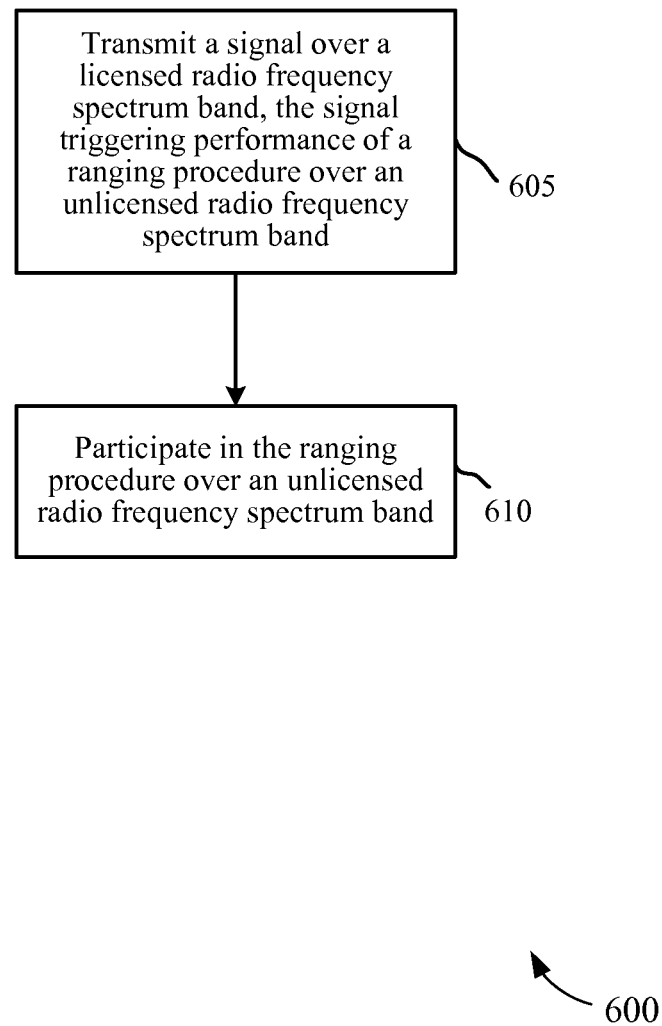
FIG. 6 is a flowchart illustrating an example of a method for wireless communication, in accordance with various aspects of the present disclosure.

FIG. 6 is a flowchart illustrating an example of a method 600 for wireless communication, in accordance with various aspects of the present disclosure. The method 600 described below may be performed in accordance with aspects of the UEs 115 described with reference to FIG. 1, and/or the apparatus 115-d, 115-e, 115-f and/or 115-g described with reference to FIGS. 3A, 3B, 3C and/or 4. Alternatively, the method 600 may be performed in accordance with aspects of the base stations 105 described with reference to FIG. 1, and/or the base station 105-a described with reference to FIG. 5. In some implementations, such a UE, apparatus or base station may execute one or more sets of codes to control the functional elements of the UE, apparatus or base station to perform the functions described below.

At block 605, a signal may be transmitted over a licensed radio frequency spectrum band. At block 610, the device may participate in a ranging procedure over an unlicensed radio frequency spectrum band with a receiver of the signal. The signal may be configured to trigger performance of a ranging procedure over an unlicensed radio frequency spectrum band. As described above, the triggered ranging procedure may be performed between the device that transmitted the triggering signal and another device(s). Alternatively, the triggered ranging procedure may be performed between a device receiving the triggering signal and another device(s) (which also may have received the triggering signal). In such a manner, devices that may conventionally perform discovery or ranging using a licensed radio frequency spectrum band may be caused to use an unlicensed radio frequency spectrum band for ranging and/or position determination with greater accuracy.

Figure 7:
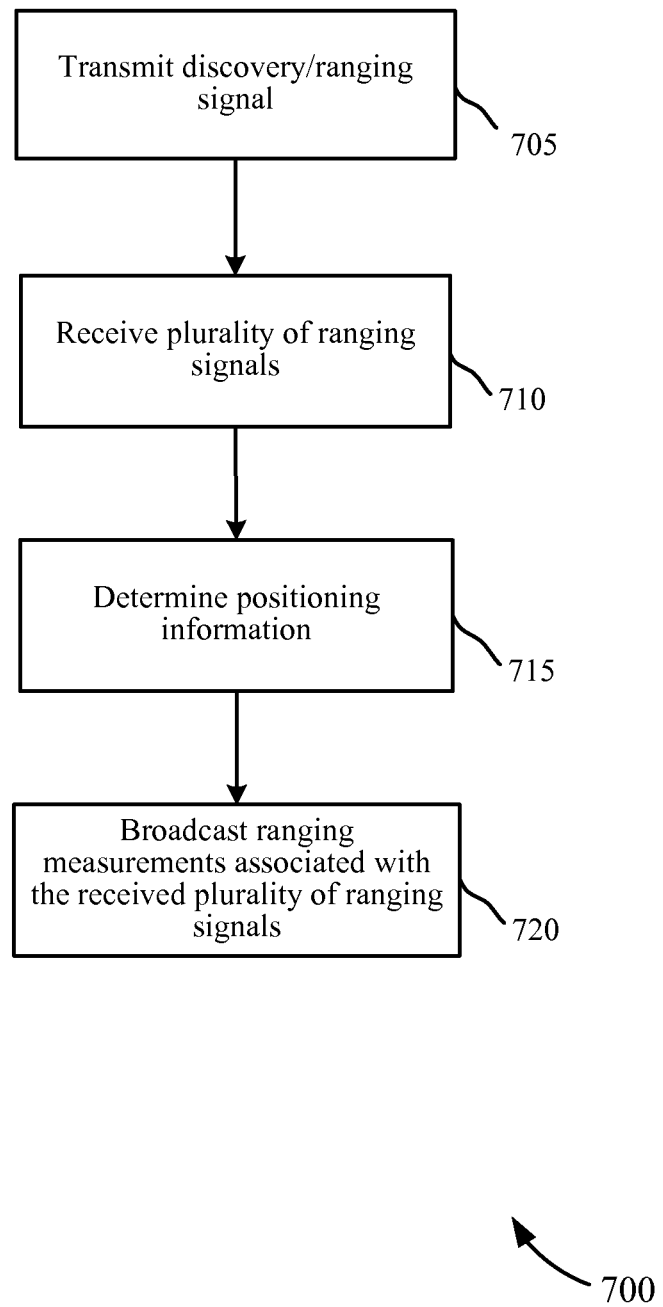
FIG. 7 is a flowchart illustrating another example of a method for wireless communication, in accordance with various aspects of the present disclosure.

FIG. 7 is a flowchart illustrating another example of a method 700 for wireless communication, in accordance with various aspects of the present disclosure. As with the method 600 described above, the method 700 may be performed in accordance with aspects of the UEs 115 or the base stations 105 described herein.

At block 705, a discovery or ranging signal may be transmitted by a device. This signal may be a triggering signal transmitted using a licensed radio frequency spectrum band, or may be transmitted using an unlicensed radio frequency spectrum band in response to a received triggering signal. Then, at block 710, a plurality of ranging signals from multiple devices may be received by the device over the unlicensed radio frequency spectrum band in response to the transmitted signal.

The received ranging signals may include ranging measurements from the multiple devices and positions/locations of the multiple devices. At block 715, positioning information (e.g., position or location) of the device may be determined using the ranging measurements and positions/locations.

Optionally, at block 720, the device may broadcast the ranging measurements associated with the received plurality of ranging signals (e.g., along with a ranging signal from the device). The broadcast signals may thus provide information that may be used by another device to determine position/location of that device.

Figure 8:
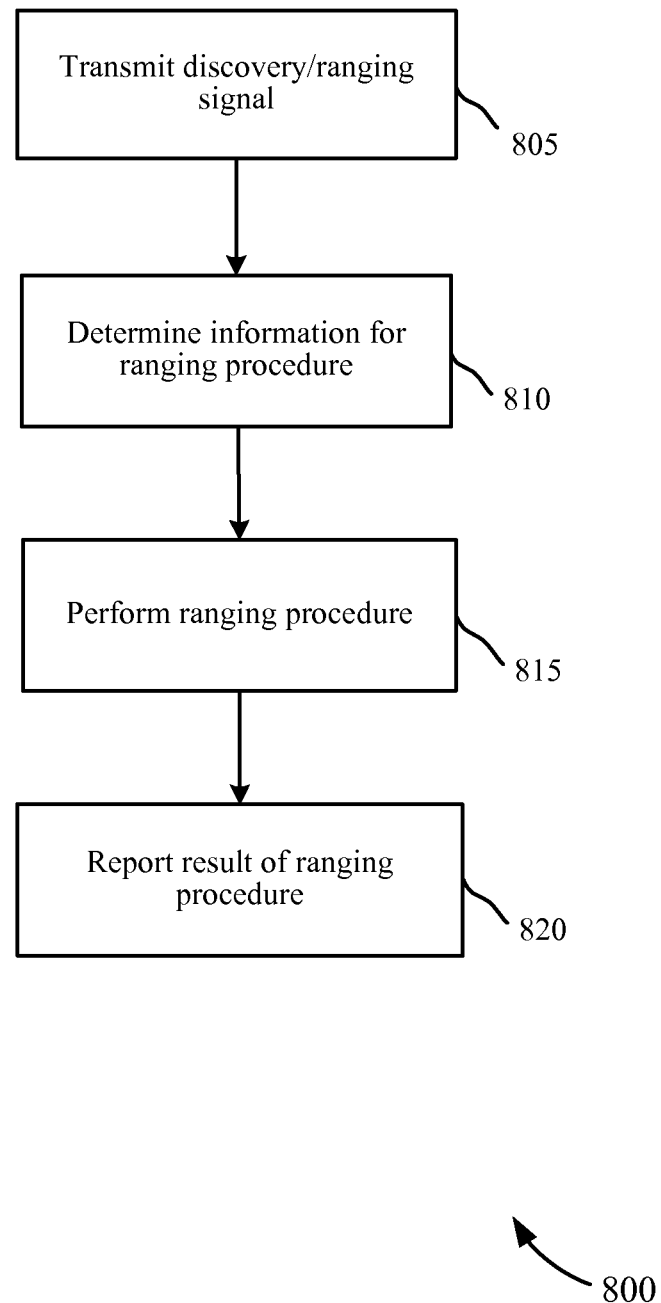
FIG. 8 is a flowchart illustrating yet another example of a method for wireless communication, in accordance with various aspects of the present disclosure.

FIG. 8 is a flowchart illustrating yet another example of a method 800 for wireless communication, in accordance with various aspects of the present disclosure. As with the methods 600 and 700 described above, the method 800 may be performed in accordance with aspects of the UEs 115 or the base stations 105 described herein.

At block 805, a discovery or ranging signal may be transmitted by a first device. This signal may be a triggering signal transmitted using a licensed radio frequency spectrum band, or may be transmitted using an unlicensed radio frequency spectrum band in response to a received triggering signal. Then, at block 810, the first device may determine information for performing a ranging procedure over the unlicensed radio frequency spectrum band. As described above, this information may be included in and/or indicated by the discovery/ranging signal.

Next, at block 815, the first device may perform the ranging procedure with a second device using the unlicensed radio frequency spectrum band. Optionally, at block 820, the first device may report results (e.g., range/pseudo-range measurement(s)) of the ranging procedure, for example, to a base station. Doing so may allow other devices in a network that includes the base station to use the results, for example, for determining position/location.

Figure 9:
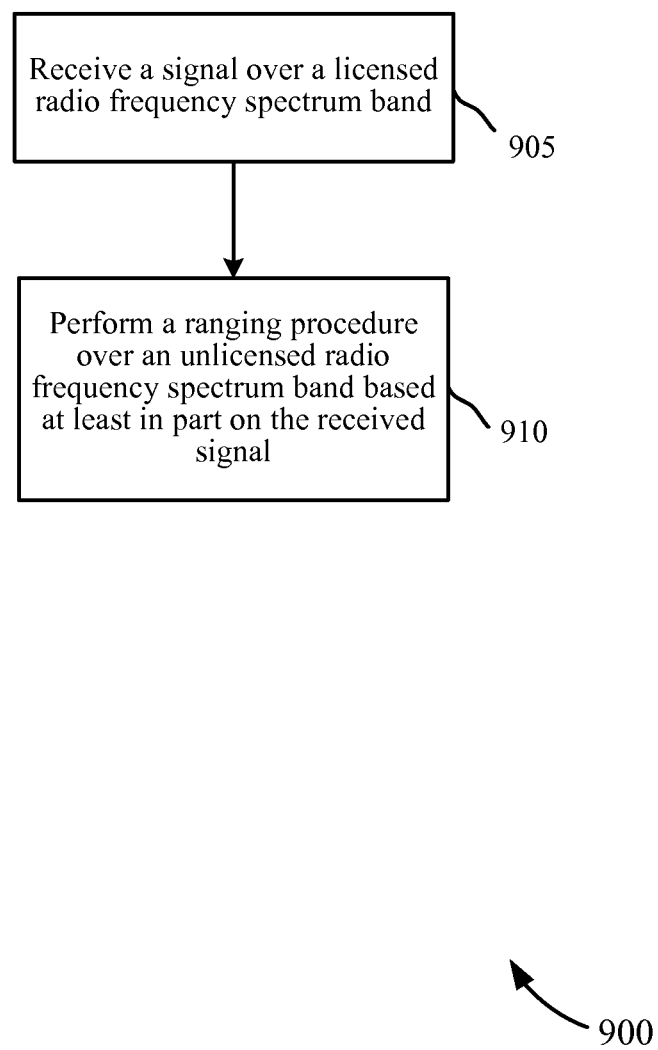
FIG. 9 is a flowchart illustrating still another example of a method for wireless communication, in accordance with various aspects of the present disclosure.

FIG. 9 is a flowchart illustrating still another example of a method 900 for wireless communication, in accordance with various aspects of the present disclosure. As with the methods 600, 700 and 800 described above, the method 900 may be performed in accordance with aspects of the UEs 115 or the base stations 105 described herein.

At block 905, a signal may be received over a licensed radio frequency spectrum band by a device. Then, at block 910, the device may perform a ranging procedure over an unlicensed radio frequency spectrum band based at least in part on the received signal. Thus, the received signal may be a triggering signal as described herein. Further, the ranging procedure performed using the unlicensed radio frequency spectrum band may provide better accuracy for range/pseudo-range measurements than is possible using the licensed radio frequency spectrum band.

Figure 10:
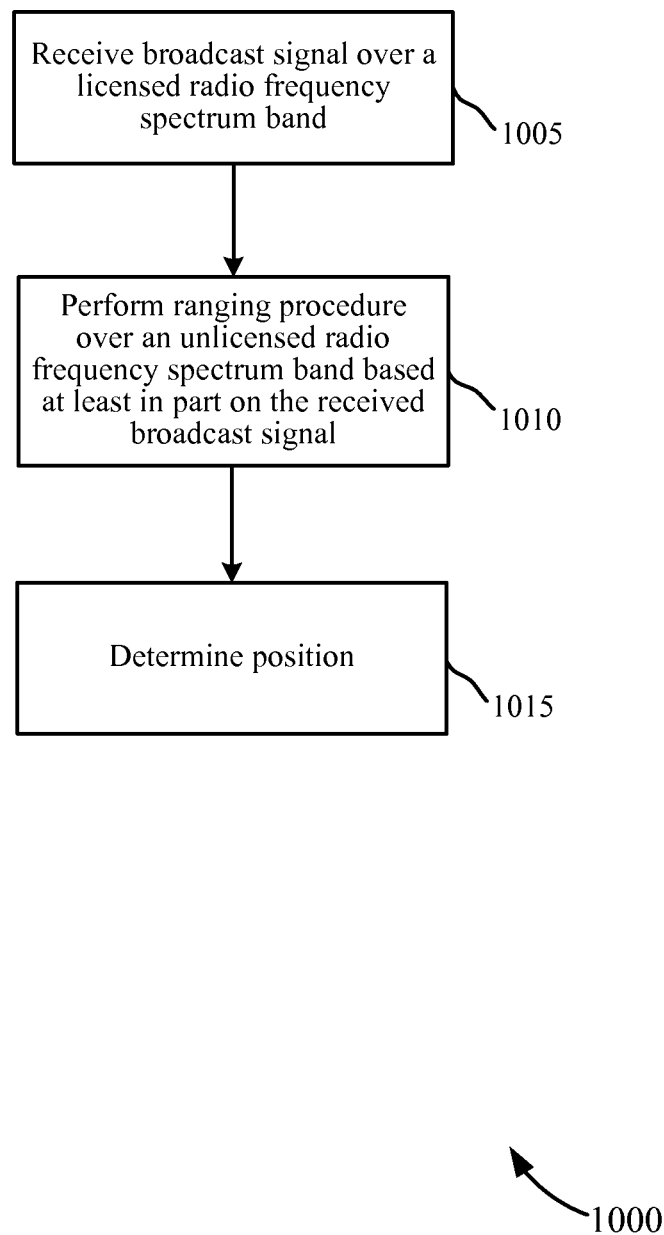
FIG. 10 is a flowchart illustrating a further example of a method for wireless communication, in accordance with various aspects of the present disclosure.

FIG. 10 is a flowchart illustrating a further example of a method 1000 for wireless communication, in accordance with various aspects of the present disclosure. As with the methods 600, 700, 800 and 900 described above, the method 1000 may be performed in accordance with aspects of the UEs 115 or the base stations 105 described herein.

At block 1005, a broadcast signal may be received over a licensed radio frequency spectrum band by a device. Then, at block 1010, the device may perform a ranging procedure over an unlicensed radio frequency spectrum band, triggered by the received broadcast signal.

In some cases, the received broadcast signal may include range/pseudo-range measurement results from other devices, as well as the positions of the other devices. Thus, at block 1015, the device may determine its position using information included in the broadcast signal and a range-pseudo-range measurement result from the performed ranging procedure.

The detailed description set forth above in connection with the appended drawings describes exemplary embodiments and does not represent the only embodiments that may be implemented or that are within the scope of the claims. The term "example" or "exemplary," when used throughout this description, means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, electrically erasable programmable ROM (EEPROM), compact disk ROM (CD-ROM) or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Throughout this disclosure the term "example" or "exemplary" indicates an example or instance and does not imply or require any preference for the noted example. Thus, the disclosure is not to be limited to the examples and designs described herein but is to be accorded the broadest scope consistent with the principles and novel features disclosed herein.

What is claimed is:

1. A method for wireless communications, comprising:
    transmitting a signal over a licensed radio frequency spectrum band having a first bandwidth, the signal triggering performance of a ranging procedure over an unlicensed radio frequency spectrum band having a second bandwidth that is greater than the first bandwidth, wherein the signal includes information for performing the ranging procedure, the information including an indication that a transmitting device is capable of performing the ranging procedure over the unlicensed radio frequency spectrum band, a schedule for the ranging procedure over the unlicensed radio frequency spectrum band, an indication of a time to begin ranging measurements after the transmitted signal is received by a receiving device, and bandwidth, center frequency, and a pre-set time slot for performing the ranging procedure.

2. The method of claim 1, wherein transmitting the signal comprises transmitting a discovery signal or a ranging signal over the licensed radio frequency spectrum band.

3. The method of claim 2, wherein transmitting the signal comprises broadcasting the signal, the method further comprising:
    receiving a plurality of ranging signals over the unlicensed radio frequency spectrum band in response to the broadcast signal.

4. The method of claim 3, further comprising:
    determining positioning information associated with at least one device based at least in part on the received plurality of ranging signals.

5. The method of claim 3, further comprising:
    broadcasting ranging measurements associated with the received plurality of ranging signals.

6. The method of claim 1, further comprising:
    determining information for performing the ranging procedure based at least in part on the signal.

7. The method of claim 6, wherein determining information for performing the ranging procedure comprises decoding at least part of the signal.

8. The method of claim 6, wherein determining information for performing the ranging procedure comprises applying a pre-defined map indicating a spectrum band for the ranging procedure.

9. The method of claim 6, wherein determining information for performing the ranging procedure comprises accessing a resource indicated by at least part of the signal.

10. The method of claim 1, wherein the information included in the signal is pre-configured.

11. The method of claim 1, wherein transmitting the signal is performed by a base station, the signal providing at least one parameter for coordinating the ranging procedure between at least two user equipments (UEs).

12. The method of claim 11, wherein the at least one parameter provided by the signal comprises a schedule for performance of the ranging procedure by the at least two UEs.

13. The method of claim 11, wherein the at least one parameter provided by the signal comprises a schedule for periodic performance of the ranging procedure by the at least two UEs.

14. The method of claim 1, wherein:
    transmitting the signal is performed by a base station;

the ranging procedure comprises a ranging measurement; and the signal causes at least one user equipment (UE) to report a result of the ranging measurement to the base station.

15. The method of claim 1, wherein:

transmitting the signal is performed by a base station; and the signal includes a schedule for performing the ranging procedure over the unlicensed radio frequency spectrum band.

16. The method of claim 15, further comprising:

performing, by the base station, the ranging procedure according to the schedule.

17. The method of claim 15, wherein the signal includes a schedule for at least one other base station for performing the ranging procedure over the unlicensed radio frequency spectrum band.

18. An apparatus for wireless communication, comprising:

a transmitter to transmit a signal over a licensed radio frequency spectrum band having a first bandwidth, the signal being configured to trigger performance of a ranging procedure over an unlicensed radio frequency spectrum band having a second bandwidth that is greater than the first bandwidth, wherein the signal includes information for performing the ranging procedure, the information including an indication that a transmitting device is capable of performing the ranging procedure over the unlicensed radio frequency spectrum band, a schedule for the ranging procedure over the unlicensed radio frequency spectrum band, an indication of a time to begin ranging measurements after the transmitted signal is received by a receiving device, and bandwidth, center frequency, and a pre-set time slot for performing the ranging procedure.

19. The apparatus of claim 18, wherein the transmitter transmits the signal as a discovery signal or a ranging signal.

20. The apparatus of claim 19, wherein the transmitter broadcasts the signal, the apparatus further comprising:

a receiver to receive a plurality of ranging signals over the unlicensed radio frequency spectrum band in response to the broadcast signal.

21. The apparatus of claim 20, wherein the transmitter further broadcasts ranging measurements associated with the received plurality of ranging signals.

22. A method for wireless communications, comprising:

receiving a signal over a licensed radio frequency spectrum band having a first bandwidth; and performing a ranging procedure over an unlicensed radio frequency spectrum band having a second bandwidth based at least in part on the received signal, wherein the second bandwidth is greater than the first bandwidth, and wherein the received signal includes information for performing the ranging procedure, the information including an indication that a transmitting device is capable of performing the ranging procedure over the unlicensed radio frequency spectrum band, a schedule for the ranging procedure over the unlicensed radio frequency spectrum band, an indication of a time to begin ranging measurements after the transmitted signal is received by a receiving device, and bandwidth, center frequency, and a pre-set time slot for performing the ranging procedure.

23. The method of claim 22, wherein receiving the signal comprises receiving a discovery request message from a user equipment (UE).

24. The method of claim 22, wherein performing the ranging procedure comprises transmitting a plurality of ranging signals on a same frequency of the unlicensed radio frequency spectrum band.

25. The method of claim 22, wherein performing the ranging procedure comprises transmitting at least one ranging signal on a plurality of frequencies of the unlicensed radio frequency spectrum band.

26. The method of claim 22, wherein receiving the signal comprises receiving a broadcast signal from a user equipment (UE).

27. The method of claim 26, wherein the received broadcast signal includes a plurality of ranging measurements from multiple devices, the method further comprising:

using a ranging measurement resulting from performing the ranging procedure over the unlicensed radio frequency spectrum band and at least one ranging measurement from the plurality of ranging measurements to determine a position of a device that performed the ranging procedure over the unlicensed radio frequency spectrum band.

* * * * *